United States Patent Office 3,116,258
Patented Dec. 31, 1963

3,116,258
RECLAIMED OIL COMPOSITION FOR RUBBER
Ernest W. J. Beaven, Windsor, Berks, England, assignor to Shell Oil Company, New York, N.Y., a corporation of Delaware
No Drawing. Filed May 5, 1961, Ser. No. 107,924
Claims priority, application Great Britain Sept. 19, 1960
5 Claims. (Cl. 252—364)

This invention relates to improved liquid hydrocarbon compositions particularly suitable for the reclaiming or regenerating elastomers of the natural or synthetic types such as natural or synthetic rubbers.

It is known in the art that reclaiming oils are limited in their use to either natural rubber or synthetic rubbers such as "Buna N" or "Buna S" rubbers which are co-polymers of butadiene and acrylic-nitrile or butadiene and styrene respectively. Thus reclaiming oils effective as penetrants, swelling and plasticizing agents for natural rubbers are generally ineffective for synthetic rubbers and those effective for synthetic rubbers are poor for reclaiming of natural rubber. Also generally reclaiming oils which are effective penetrants or swelling agents are poor as plasticizers so that in general there is much to be desired from known commercial reclaiming oils.

It has now been discovered that an excellent reclaiming liquid hydrocarbon composition for use in reclaiming either natural or synthetic rubbers is provided by forming a blend comprising (A) a mixture of alkyl benzenes and (B) a mixture of alkyl naphthalenes, the mixture of (A) and (B) having an aniline point of less than 15° C., preferably below 0° C. and as low as below −38° C.

The aniline point of an oil is the minimum equilibrium solution temperature for equal volumes of aniline and oil. The mixed aniline point is the minimum equilibrium solution temperature of a mixture of two volumes of aniline, one volume of oil and one volume of n-heptane of specified purity (see ASTM D1012–51). Suitable methods of measuring the aniline point are described in ASTM method D1012–51 and in the "IP Standards for Petroleum and its Products," 19th Edition, March 1960 (IP2/56). The method of determining the mixed aniline point is described in ASTM method D1012–51.

Component A of the mixture, i.e., a mixture of alkyl benzenes usually has an initial boiling point of at least about 130° C. It is preferable however for the mixture of alkyl benzenes to have a wide boiling range, for example between about 130° C. and about 300° C.

Suitable alkyl benzenes are ethyl benzene, the xylenes, isopropyl benzene, the trimethyl benzenes, tert butyl benzene, 1,2,3,4, tetramethyl benzene, and other higher mono- and poly-alkylated benzenes. A particularly suitable mixture of alkyl benzenes has been found to be a mixture having an initial boiling point of between 160° C. and 165° C., a final boiling point of between 270° C. and 275° C., 20% by volume boiling over at between 185° C. and 190° C., 50% by volume between 205° C. and 215° C. and 90% by volume between 250° C. and 255° C. Such a mixture comprises butyl and higher alkyl benzenes and tri- and tetra-methyl and tri- and tetra-higher alkyl benzenes. The mixed aniline point of such a blend is about 24° C.

The mixture of alkyl benzenes is preferably prepared by liquid sulfur dioxide extraction of kerosene. In this process kerosene is treated with liquid SO$_2$, for example in a packed tower. The sulfur dioxide dissolves the aromatic components from the raffinate which is removed as top layer. The bottom layer, i.e. the extract, contains the desired mixture of alkyl benzenes which can be obtained therefrom after removal of any dissolved SO$_2$, e.g., by evaporation. Alkyl benzenes and mixtures of alkyl benzenes may also be prepared by the conventional methods, i.e., by reacting benzene with an alkylating agent such as an olefin or alkyl halide in the presence of a catalyst such as phosphoric acid, sulfuric acid, aluminum trichloride or especially hydrofluoric acid and boron trifluoride. The desired alkylated benzene or benzenes can be obtained by distilling the reaction mixture, after separating off any unreacted benzene and/or alkylating agent which distills off first.

Component B of the mixtures, i.e., a mixture of alkyl naphthalenes preferably have a fairly wide boiling range, for example between about 175° C. and about 325° C. Suitable alkyl naphthalenes include alpha and beta monomethyl and ethyl naphthalenes, 1,2; 1,6; 1,7; and 2,6 dimethyl naphthalenes, the trimethyl naphthalenes and acenaphthalene. A particularly suitable mixture of alkyl naphthalenes was obtained by cracking naphtha thermally to yield a complex mixture of products gaseous at the high temperature of the operation, quenching the mixture with water and separating into a gaseous and a heavy liquid fraction, and distilling the liquid fraction to obtain the desired mixture comprising alkyl naphthalenes as liquid distillate. This mixture comprises alpha- and beta-monomethyl naphthalenes, 1,2; 1,6; 1,7 and 2,6 dimethyl naphthalenes, trimethyl naphthalenes, acenaphthalene as well as fluorene and about 20% naphthalene. Its initial boiling point was about 160° C. and its aniline point was below −15° C. Alkyl naphthalenes may also be prepared by the conventional methods of alkylating aromatic compounds, e.g., alpha-methyl naphthalene may be synthesized, for example by the Wurtz-Fittig reaction between alpha-bromonaphthalene, methyl iodide and sodium.

Although naphthalene may also be present in the mixture of alkyl naphthalene it is preferable to limit its quantity to less than about 20% by weight, for example about 10% by weight or even lower.

If the aniline points of components A and B are both below 15° C. the ratio of component A to component B may vary within wide limits. If however, one of the components should have an aniline point above 15° C., the maximum proportion of this component in the final blend is limited by the necessity of the aniline point of the final blend being below 15° C. A very suitable ratio of component A to component B has been found to be about 30:70 by weight, especially when using the above-mentioned preferred mixtures of alkyl benzenes and alkyl naphthalenes as components A and B respectively.

A ratio component A to component B of about 20:80 by weight has also been found to be very suitable. Particularly preferred ratios of component A to component B are therefore between about 15:85 and 35:65 by weight.

Compared with other rubber reclaim oils hitherto known, the aniline point of the reclaim composition according to the present invention is very low, especially as in most cases the hydrocarbon composition of the invention has an aniline point below 0° C. for example as low as below −38° C. Using the above described preferred mixtures of alkyl benzenes and alkyl naphthalenes in the ratio 30:70 the resultant blend was found to have an aniline point of about −38° C.

The oil according to the invention may be used for the reclaiming of either styrene-butadiene synthetic or natural rubber or a mixture of both types of rubber.

Thus, in one process for example, old tires, after sorting and removal of the metal bead are cracked in large cracker mills, having deep fluted mills. Following cracking into the desired particle size, the scrap is transferred with reclaim oil to a digester where it is heated to a temperature of about 200° C. for between 3 and 10 hours in order to destroy the fabric and soften the rubber.

Usually the digestion vessels operate at sufficient temperatures to enable a suitable swelling agent to be used.

When the digestion is complete the contents of the digester are washed with water and dried in continuous driers. The reclaimed rubber is then blended using either an 84" mill or a Banbury mixer, during which blending pigments or further softeners may be added if necessary. The refining process is then carried out, softened scrap being fed through rolls rotating at different speeds, the refined stock being obtained as a thin sheet. This refined stock is then extruded through fine filter holes to obtain strained rubber which is passed through finishing refiner rolls. The thin sheet thereby obtained may then be wound up on drums for storage or transport.

*Example 1*

A reclaim hydrocarbon composition was prepared by mixing (A) a mixture consisting mainly of alkyl benzenes prepared by liquid sulfur-dioxide extraction of kerosene and (B) a mixture consisting mainly of alkyl naphthalenes and containing up to 20% naphthalene obtained from the thermal cracking of naphtha in a weight ratio A:B of 30:70.

The physical properties of (A) were as follows:

| | |
|---|---|
| Specific gravity at 15.5° C | 0.895 |
| Aromatic content percent by volume | 87 |
| Distillation range: | |
|   Initial boiling point °C | 162 |
|   20% boiled over at °C | 178 |
|   50% boiled over at °C | 210 |
|   90% boiled over at °C | 252 |
|   Final boiling point °C | 272 |
|   Mixed aniline point °C | 76 |

The alkyl benzenes present included butyl benzenes and tri- and tetra-methyl benzenes.

The physical properties of (B) were as follows:

| | |
|---|---|
| Specific gravity at 15.5° C | 1.012 |
| Initial boiling point | 160° C. |
| Aniline point | Below −15° C. |

The alkyl naphthalenes present were alpha- and beta-monomethyl naphthalenes, 1,2; 1,6; 1,7 and 2,6 dimethyl naphthalenes, various trinaphthalenes and acenaphthalenes. A small amount of fluorene as well up to about 20% naphthalene was also present.

The physical properties of the blend of (A) and (B) were as follows.

Flash point:

| | |
|---|---|
|   Pensky Martens C.C. (IP34) | 150° F. |
|   Pensky Martens O.C. (IP35) | 175° F. |
| Distillation range (ASTM D-86): | |
|   Initial boiling point | 175° C. |
|   5% vol. recovered at | 187° C. |
|   10% vol. recovered at | 194° C. |
|   20% vol. recovered at | 204° C. |
|   30% vol. recovered at | 211.5° C. |
|   40% vol. recovered at | 219.5° C. |
|   50% vol. recovered at | 228° C. |
|   60% vol. recovered at | 236° C. |
|   70% vol. recovered at | 247° C. |
|   80% vol. recovered at | 258° C. |
|   90% vol. recovered at | 303° C. |
|   Total recovery | 90% v. |
|   End point | 321° C. |
| Bromine number (IP129) | 27.3. |
| Specific gravity, 15.5° C | 0.9763. |
| Aniline point (IP2) | Below −38° C |
| Kinematic viscosities (IP71): | |
|   At 100° C | 1.75 cs. |
|   At 140° F | 1.23 cs. |
|   At 210° F | 0.79 cs. |

The liquid hydrocarbon composition was found suitable as a reclaim product for both natural and synthetic rubber.

*Example 2*

A reclaim liquid hydrocarbon composition was prepared by mixing the alkyl benzene-containing mixture (A) of Example 1 with the alkyl naphthalene-containing mixture (B) of Example 1 in a weight ratio A:B of 20:80.

The aniline point of the blend was less than 0° C.

This oil was found suitable as a reclaim product for both natural and styrene-butadiene synthetic rubber.

Liquid hydrocarbon mixtures of the present invention possess excellent penetrating, swelling and plasticizing properties when used as reclaiming oils for natural rubber or synthetic rubber of the Buna S type and also the amount used is generally much less than conventional reclaiming oils thus affording an additional benefit, namely an economic one and better recovered products.

I claim as my invention:

1. A rubber reclaiming liquid hydrocarbon composition consisting essentially of (A) a mixture of alkyl benzenes and (B) a mixture of alkyl naphthalenes, the mixture (A) and (B) having an aniline point of less than 15° C. and the weight ratio of (A) to (B) being in the range from about 15:85 to 35:65.

2. The composition of claim 1 wherein the (A) mixture of alkyl benzenes has a boiling range between 130° C. and 300° C.

3. The composition of claim 1 in which the (A) mixture of alkyl benzenes has an initial boiling point of between 160° C. and 165° C. a final boiling point of between 270° C. and 275° C., 20% by volume boiling over between 189° C. and 190° C., 50% by volume boiling over at between 205° C. and 215° C. and 90% by volume boiling over between 250° C. and 255° C.

4. The composition of claim 1 in which the (A) mixture is prepared by liquid $SO_2$ extraction of kerosene and the (B) mixture has a boiling range of between 175° C. and 325° C.

5. A rubber reclaiming liquid hydrocarbon composition consisting essentially of (A) a mixture of alkyl benzenes prepared by $SO_2$ extraction of kerosene and (B) a mixture of alkyl naphthalenes selected from the group consisting of 1,2; 1,6; 1,7 and 2,6 dimethyl naphthalenes, trimethyl naphthalenes and acenaphthalene, said mixture of (A) and (B) having an aniline point from less than 15° C. to below −38° C. and the weight ratio of (A) and (B) being in the range from about 15:85 to 35:65.

References Cited in the file of this patent

UNITED STATES PATENTS 2,449,879   Corkery   Sept. 21, 1948